(12) United States Patent
Friedman et al.

(10) Patent No.: US 7,278,682 B2
(45) Date of Patent: Oct. 9, 2007

(54) VEHICLE SEAT WITH ROLLOVER SAFETY FEATURES

(75) Inventors: Keith Friedman, Santa Barbara, CA (US); Dennis Mihora, Santa Barbara, CA (US)

(73) Assignee: Friedman Research Corporation, Santa Barbara, CA (US)

( * ) Notice: Subject to any disclaimer, the term of this patent is extended or adjusted under 35 U.S.C. 154(b) by 325 days.

(21) Appl. No.: 10/807,325

(22) Filed: Mar. 24, 2004

(65) Prior Publication Data

US 2005/0211491 A1    Sep. 29, 2005

(51) Int. Cl.
*B60N 2/42* (2006.01)

(52) U.S. Cl. ............... 297/216.1; 297/216.18

(58) Field of Classification Search ............ 297/216.1, 297/216.18, 344.1; 180/271, 282
See application file for complete search history.

(56) References Cited

U.S. PATENT DOCUMENTS

| | | | | |
|---|---|---|---|---|
| 2,758,872 A | * | 8/1956 | Gerhard et al. | 296/65.12 |
| 3,637,253 A | * | 1/1972 | Maule et al. | 296/65.11 |
| 5,149,165 A | * | 9/1992 | Woolley | 296/68.1 |
| 5,186,494 A | * | 2/1993 | Shimose | 280/806 |
| 5,492,368 A | * | 2/1996 | Pywell et al. | 280/806 |
| 5,584,525 A | * | 12/1996 | Nakano et al. | 296/68.1 |
| 5,743,591 A | * | 4/1998 | Tame | 297/216.1 |
| 6,053,571 A | * | 4/2000 | Faigle | 297/216.13 |
| 6,076,887 A | * | 6/2000 | Andersson | 297/216.1 |
| 6,182,783 B1 | * | 2/2001 | Bayley | 180/282 |
| 6,574,540 B2 | * | 6/2003 | Yokota et al. | 701/45 |
| 6,592,166 B2 | * | 7/2003 | Motozawa | 296/68.1 |
| 6,682,059 B1 | * | 1/2004 | Daniels et al. | 267/131 |
| 7,195,092 B2 | * | 3/2007 | Wu et al. | 180/282 |
| 7,200,474 B2 | * | 4/2007 | Motozawa et al. | 701/45 |
| 2002/0188393 A1 | | 12/2002 | Yokota et al. | |

FOREIGN PATENT DOCUMENTS

| | | |
|---|---|---|
| DE | 10008972 A1 | 9/2001 |
| WO | WO 01/45985 A1 | 6/2001 |
| WO | WO 2004/103779 A1 | 3/2004 |

\* cited by examiner

*Primary Examiner*—David Dunn
*Assistant Examiner*—Tania Abraham
(74) *Attorney, Agent, or Firm*—Mark Rodgers

(57) ABSTRACT

This invention is vehicle seat, which provides enhanced occupant protection in the event of a vehicle rollover. The seat includes a rollover sensor and mechanisms compatible with power-adjustable seat design, that cause rapid distancing of the occupant from the vehicle roof in the event of a rollover. The mechanisms include high-speed motors operating reclining, lateral position, and seat lowering mechanisms, as well as pyro actuators for these mechanisms.

10 Claims, 4 Drawing Sheets

VEHICLE SEAT WITH ROLLOVER SAFETY FEATURES

RELATED APPLICATIONS

Not Applicable

FEDERALLY SPONSORED RESEARCH

Not Applicable

SEQUENCE LISTING

Not Applicable

BACKGROUND OF THE INVENTION

The invention relates to vehicle seats, particularly seats for automobiles and light trucks. The seats of this invention will provide increased occupant protection in the event of a rollover accident. Rollover accidents occur relatively slowly compared to other accidents, such as front, side, or rear impacts. Thus rollover accidents require a different response compared to conventional impact restraint systems to achieve occupant protection. Rollover occupant protection system design involves the integration of a number of components in the vehicle which must be compatible with each other. One element of the vehicle available to vehicle designers in developing effective rollover occupant protection system designs is the seat with integral restraint. One element of the vehicle that is particularly hazardous to restrained occupants is the intruding roof. This invention moves the occupant's head away from the vehicle roof automatically during a rollover.

It has been known in the art for some time, recognized by the inventors for almost ten years, that an important tool available to designers of occupant safety in a rollover, along with, for example, stronger roof structures, better occupant packaging, more effective restraint systems, active or passive rollbars and other available technology, is to dynamically move the occupant away from the roof before the roof crushes. In large vehicles such as truck cabs, there is room to move the entire seat straight down a large distance away from the roof, and several approaches for this problem have been proposed. Three concepts for accomplishing rollover protection in light passenger vehicles with power (electric) integrated seats (all-belts to seats) are identified: dynamically tilt the seat back rearward in order to effectively move the occupants head away from the roof and rearward in the vehicle, reorienting the torso-head/neck complex to a more advantageous orientation; compress the seat back and seat cushion to be smaller than their normal dimensions to increase headroom in conjunction with rollover actuated pretensioning seatbelts; under certain circumstances move the seat cushion forward or rearward or laterally to better position the occupant relative to the roof structure and/or to allow for the downward deployment of the seat back in restricted compartment space conditions Although solutions to some of the concepts have been previously proposed, none have been implemented in light vehicles to date. The inventors believe that the reason for the lack of implementation in production power-adjustable integrated seats is that the proposed solutions do not address the requirements of powered integrated seats. The earlier proposed solutions are not compatible with the integrated, power-adjustable seats found increasingly, for example, on light passenger vehicles.

In order to make these features available, innovative solutions, that are workable and usable on modern, powered seats, must be employed. This invention provides greatly increased protection to vehicle occupants in a rollover accident by providing novel safety mechanisms that are usable in existing power-adjustable seats.

BRIEF SUMMARY OF THE INVENTION

The invention provides for increased safety of vehicle occupants in the event of a rollover accident. Parts of the invention, unlike previous solutions, are actually capable of being implemented or retrofitted into real, current, power-adjustable seat designs. In addition, other parts are applicable to electric and non-electric seat designs.

The invention provides a seat for a vehicle, comprising a seat back, a seat cushion, and means for power adjustment for the seat. The adjustment mechanism comprises at least one motor, or one slow burn pyrotechnic actuator coupled to the seat. Relevant types of adjustment means include seat reclining, seat height adjustment, and seat position relative to the front of the car. The seat further comprises a rollover sensor. The motor operates at a low speed during normal operation, and at a very high speed in response to a signal from the rollover sensor indicating the vehicle is in a rollover condition, requiring activation. Thus the seat is reclined rearward rapidly, lowered rapidly, moved forward/backward rapidly, side-to-side rapidly, or any and all combinations, when the rollover sensor triggers the high speed operation of the motor(s).

The invention also provides for a vehicle seat, which includes means for compressing and/or translating at least one of the seat back and seat cushions in response to a signal from the rollover sensor indicating the vehicle is in a rollover condition.

It is to be understood that the concepts described above need not be all implemented in a given vehicle seat design, but that the optimum safety will be achieved if all work together in response to the rollover sensor signal, along with an integrated safety belt with a pretensioner, the pretensioner also being activated by the rollover signal. The inventor's contemplate that the best use of the invention is to integrate all of the protection mechanisms that are applicable in one seat design.

BRIEF DESCRIPTION OF THE DRAWINGS

The detailed description of how to make and use the invention will be facilitated by referring to the accompanying drawings.

DETAILED DESCRIPTION OF THE INVENTION

Figure 1:
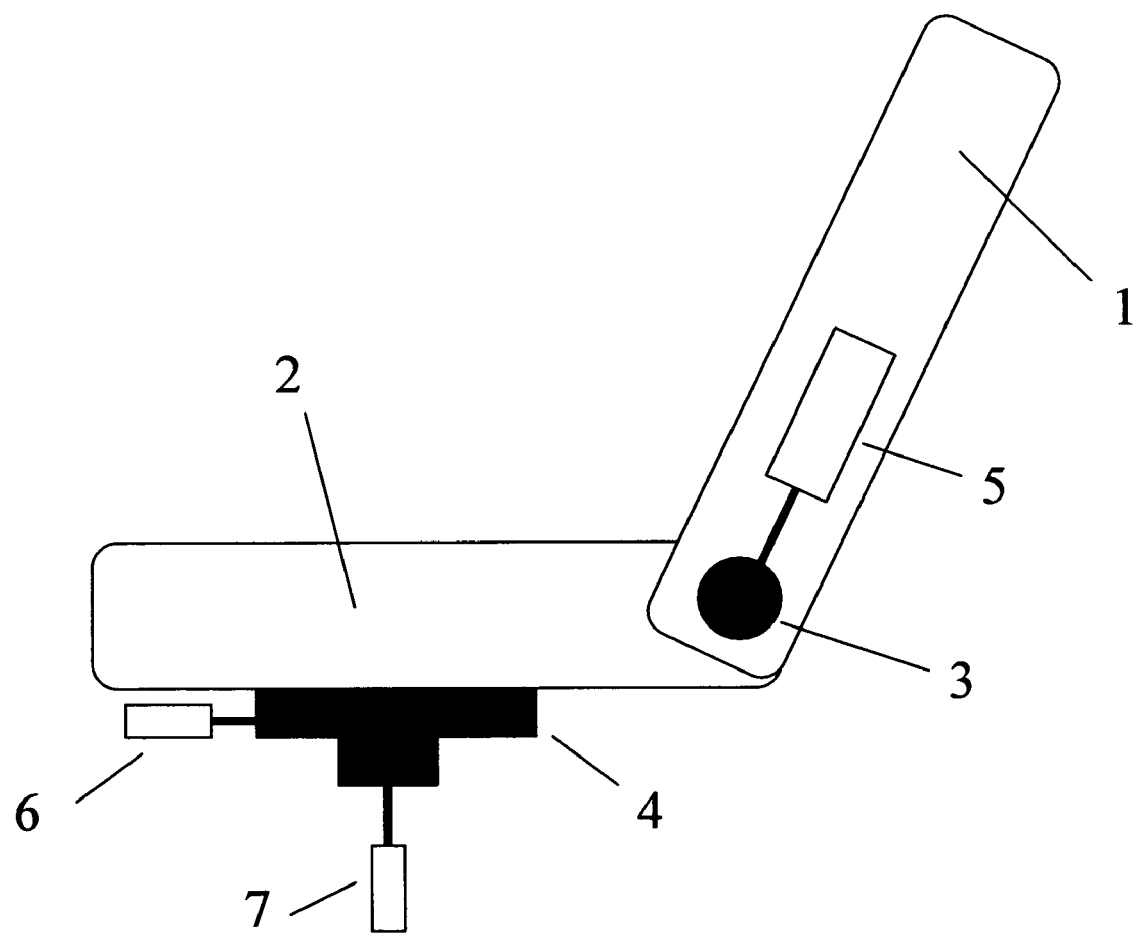
FIG. 1 depicts the major elements of the vehicle seat relative to the invention.

Referring to FIG. 1, the seat consists of a back, 1, and a cushion 2. The invention is intended to be compatible with power-adjustable seats. A wide variety of power seat designs exist, most of which are compatible with the invention. Accordingly, the components of the seat are shown in a very general form, and it is understood that the details of a particular seat design are not critical to the invention. The exemplary elements shown include a recliner motor 5, which is coupled to a rotatable member, 3, such that the motor causes either the seat back, 1, or the entire seat, depending on the design, to rotate. The seat may also include a height adjustment mechanism, shown as a motor, 7 coupled to the seat at member, 4, and a lateral adjustment mechanism, consisting of a motor, 6, coupled to the seat through member, 4. The exact make up of the couplings, and number and orientation of motors is not essential to the operation of the invention. A skilled designer of such seats will understand how to apply the invention to a particular seat design from this disclosure.

Conventional adjustment mechanism designs use motors capable of moving the seat at rates that are typically quite slow. Thus the motors in existing power seat designs are specified to achieve adequate performance for adjustment operation, but are not capable of moving the seat fast enough to be effective for rollover safety. A typical motor for a power seat uses 50 watts for motion.

The invention requires a rollover sensor in the vehicle, typically integrated with the seat. Rollover sensor designs exist in the art, which are suitable for use with the invention. For purposes of implementing the invention, a particular rollover detector sensor may be used as long as the sensor is capable of discriminating between normal operation, and a wide enough range of roll conditions to ensure that a signal indicating immediate rollover will not be generated other than during a real rollover event. The action of the invention will make it difficult for the vehicle operator to maintain control of the vehicle, and must not be deployed unless the vehicle is truly rolling over.

Figure 2:
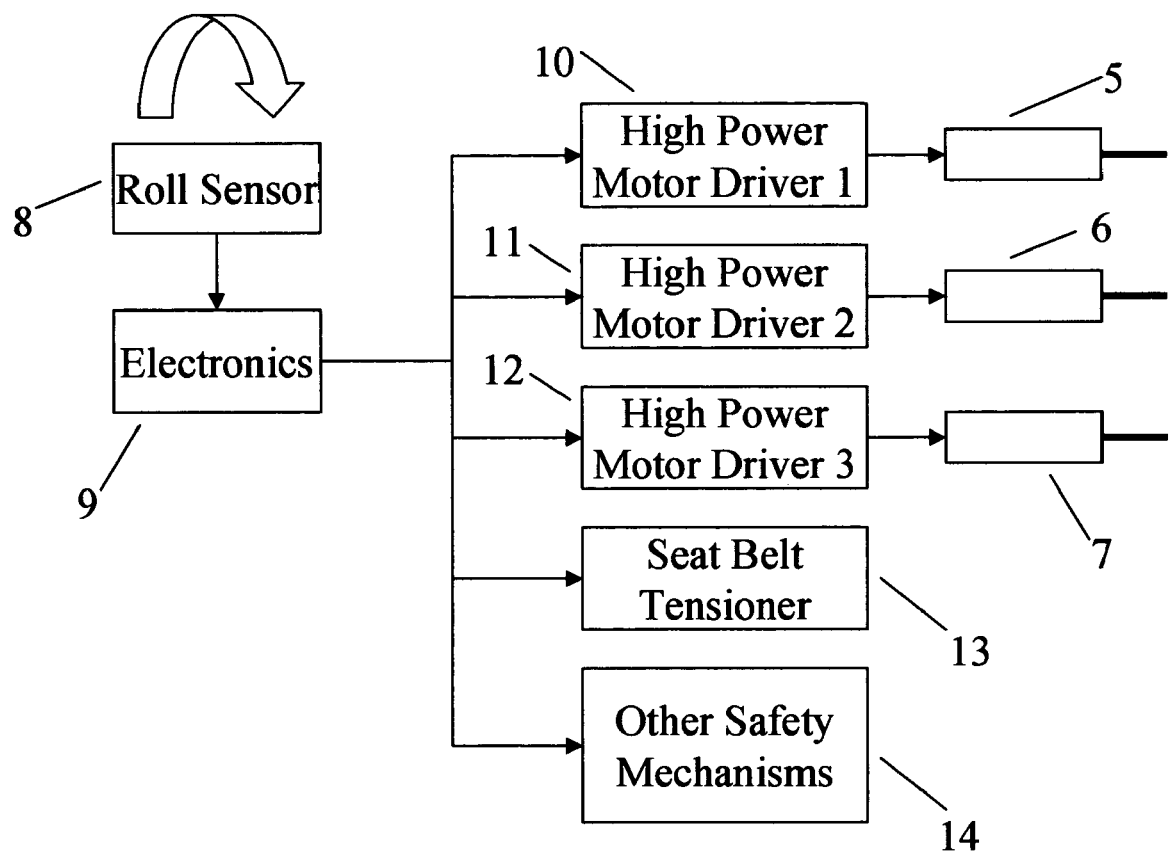
FIG. 2 shows in block diagram form the operation of the invention

The invention uses a special motor that is capable of, for at least one time period, of operating at a much higher speed than that required for normal adjustment functionality. Referring to FIG. 2, the rollover sensor, 8, with suitable electronics, 9, will generate a signal indicating that the vehicle is irretrievably in the process of rolling over. The rollover signal may cause multiple events to take place. The invention includes any combination of these events. One event is that a very high power drive signal, 10, is applied to the recliner motor, 5, causing the seat to recline rearward at a rate at least 50 deg/s, preferably 100 deg/s, much faster than normal seat adjustment rates. This higher speed is sufficient to recline the seat nominally within 0.25-0.5 seconds, well within the 2-6 seconds of time typical in a rollover scenario. A tested, suitable motor, which is compatible with existing recliner designs, yet capable of at least one high speed recline, is based on a high magnetic strength dc motor. This samarium cobalt magnet motor is a close outline and mounting match for an existing conventional seat motor. It should be appreciated, that it is acceptable for the motor to require replacement after a rollover accident, similar to airbags requiring replacement after deployment. Such a high performance motor can typically accept 1500 watts for the short run duration and for much higher motion speed than normal power seat adjustment. A suitable motor for this invention need only operate reliably at the high rate for one cycle. A typical samarium cobalt dc motor requires only 500 to 1000 J of electrical energy for this one time seatback motion (rotation). The electrical energy is provided by either the car battery, a close proximity energy supply such as a high energy density capacitor, or a small onboard battery.

Figure 3A:
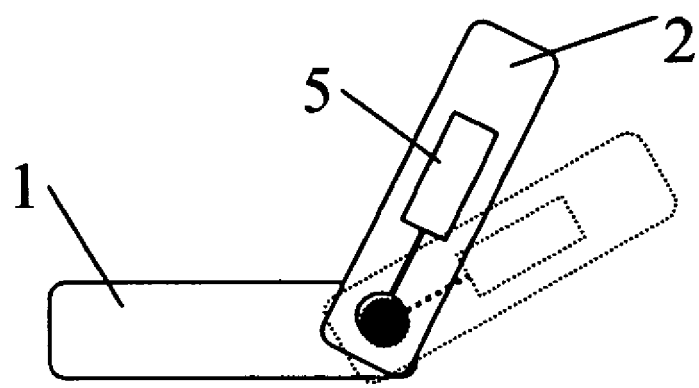
FIGS. 3a, b, and c illustrate the resultant movements of the seat in response to the rollover signal
Figure 3B:
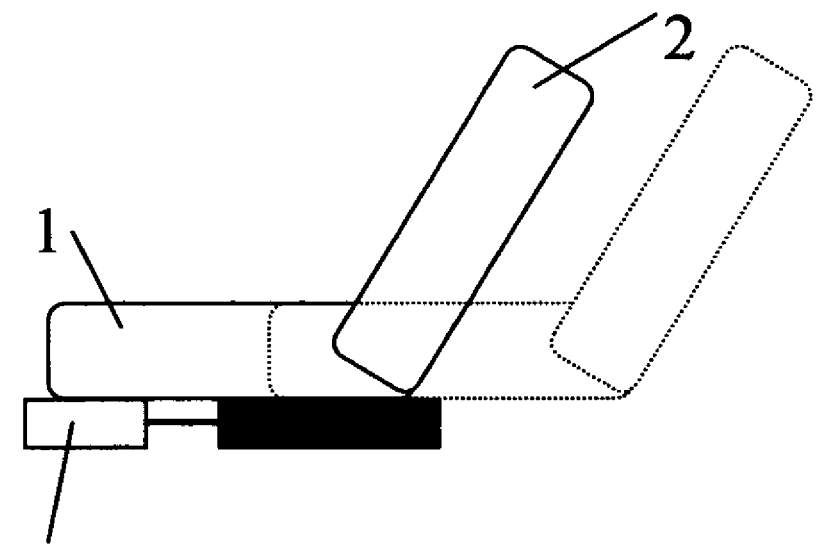
Figure 3C:
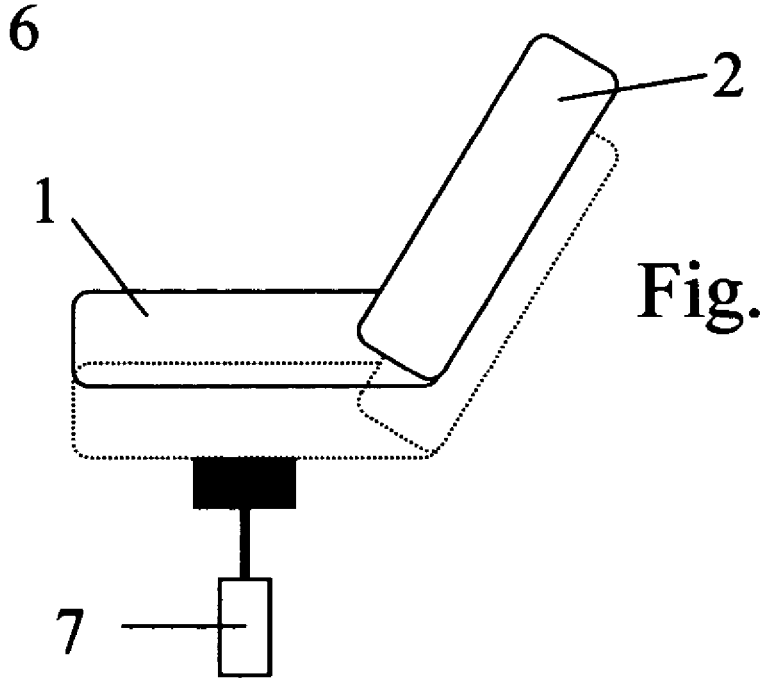

Similarly, high power signals, 12 and 13 may be applied to the height, longitudinal and lateral adjustment motors, 6 and 7, if such motors are available in a particular seat design. Thus the seat may be rapidly rotated, lowered, and optimally positioned longitudinally. The result is that well before the roof crushes substantially into the occupant space, the occupant's head and chest will have been moved significantly farther from the roof. The addition of the rollover sensor, electronics and suitable motors is fully compatible with existing power seat designs. The inventors have successfully retrofitted an existing seat with the sensor, electronics and high power motors and drivers. It is understood that any combination of these actions are considered by the invention, but optimally all three should be employed. The invention is also best implemented in combination with a seat belt, integrated with the seat. The seat belt should have at least one pretensioner, 13, known in the art, which is also triggered by the rollover signal. The separate operation of these actions is illustrated in FIGS. 3a, b and c. It is understood, that the electronics may sequence these actions appropriately, for instance compress the cushions, tension the belt, and move the seat cushion to the right position before fully reclining the seat.

Many existing power adjustable seat designs already have mechanisms that perform some or all of the three above-mentioned adjustments, recline, raise/lower, or position forward/backward. In almost all vehicles, lowering the seat and reclining it backward will have advantageous effect in a rollover accident. Depending on the layout of the vehicle, positioning the seat forward or backward may allow for more recline or lowering action. Thus the invention includes the possibility of moving the seat forward/backward in response to the rollover signal as well. It is to be understood that replacing the conventional motors with physically compatible designs capable of very high power operation, along with the suitable sensor and control electronics, allows for effective rollover protection to be added with little redesign of the vehicle, or even retrofitted to existing vehicles.

For some vehicles, moving the seat side-to-side may also allow for greater lowering/reclining. Also, depending on the nature of the rest of the rollover occupant protection system there may be safety benefit to be obtained in a rollover from moving the occupant away from the window or door. Thus a fourth movement, side-to-side, may increase occupant protection as well. The inventors know of no existing light vehicle seats that include such lateral positioning. However, for new vehicle design, a fourth movement axis, side-to-side lateral, may be designed in. The lateral positioning will also occur in response to the rollover signal, sequenced appropriately, for the specific vehicle configuration. The inventors contemplate that a motor drive, pyro actuator or other actuator of types known in the art may be employed in a side-to-side seat positioning mechanism.

For all of the above-mentioned motions, it may be advantageous to sense the current seat position before determining the sequence and nature of the rollover response movements. Depending on the seat position at the time of rollover and the shape of the vehicle interior, the direction and magnitude of positioning that will allow maximum recline/lowering may vary. Thus the invention may further include the capability of sensing current seat position, and possibly occupant size and/or weight, and determining the optimum magnitude, direction, and sequence of motions to result in the greatest possible clearance between the occupant's head and chest from the roof. Smart safety systems that sense occupant characteristics and shape the restraint response accordingly have been developed to protect smaller occupants from airbags. Also systems that measure seat position and remember it for operator convenience also exist. The invention may employ these devices for the rollover scenario, in many cases with little modification other than programming. Of course new, ground-up sensing and sequencing designs, used in conjunction with the invention, are also contemplated.

Other safety mechanisms, 14, such as airbag restraint devices and sideflaps may be triggered by the rollover signal. Of particular relevance to the invention is a mechanism for compressing the seat bottom cushion and/or seat back cushion. The occupant may be further distanced from the roof, by compressing the seat back and/or cushion. It is to be appreciated that the seat back and cushion thickness can be several inches, so compressing the thickness can easily result in gaining a few inches of head clearance, which can greatly mitigate any trauma occurring from a crushed roof. Various compression means have been proposed. One means consists of using cables or wires actuated by an explosive tensioner, such as used in seat-belt tensioners, familiar in the art. The tensioner is fired by the signal from the rollover sensor. The wire or cables are wrapped around pulleys, and pull the seat structure closer to the seat frame, when the tensioner fires and rapidly rolls up the cable. Such compression mechanisms are compatible with this invention.

Figure 4:
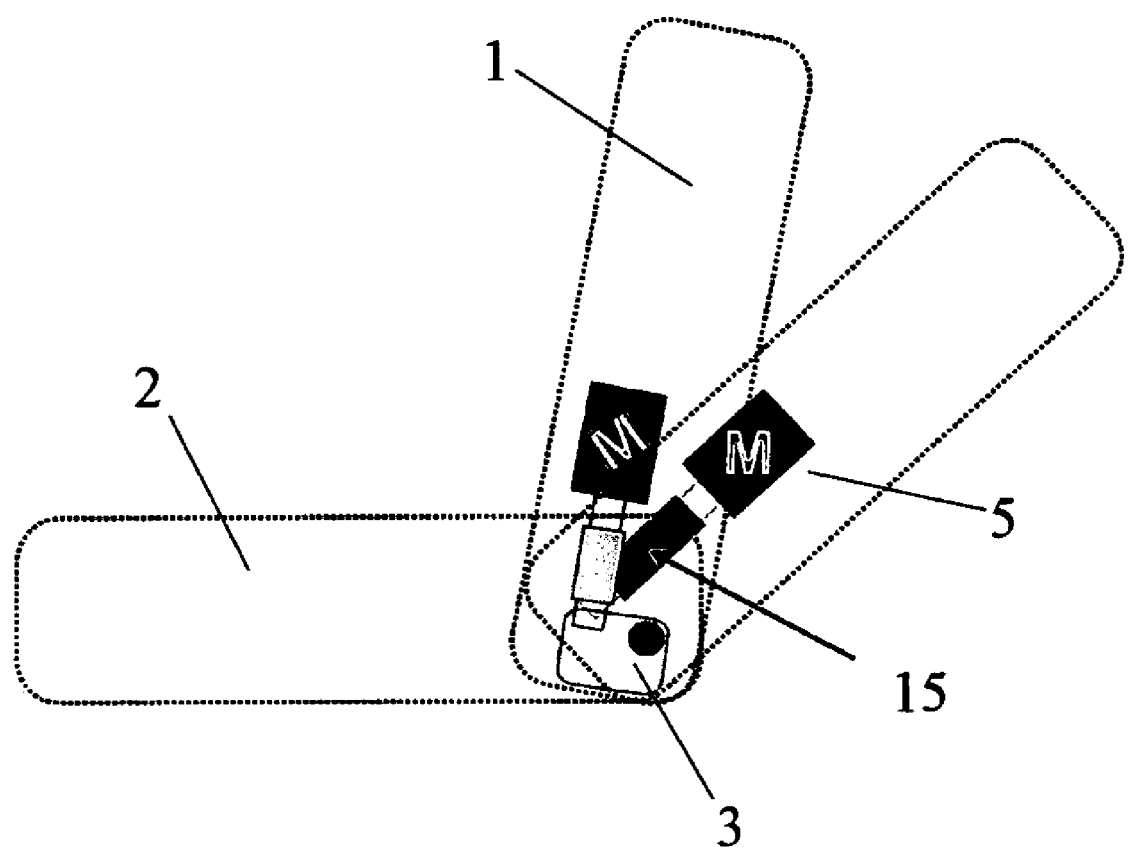
FIG. 4 shows an alternate embodiment of the invention

Another embodiment of the invention is shown in FIG. 4. The high power motor implementations described above have the advantage that they require the least seat re-design, and offer the maximum flexibility in terms of allowing for precisely tailored sequencing of seat motion. The inventors contemplate an alternative approach that is still compatible with powered seats. In FIG. 4, a pyro actuator is mounted in series with the recliner drive train. This pyro actuator is preferably of the slow burn variety, used in other automotive applications. In normal operation, the motor 5 operates the drive train normally. When fired by the rollover sensor, the pyro actuator extends or retracts relative to the rotatable member 3 causing the seat to recline rapidly, typically about 30 degrees in 0.25-0.5 second. The same approach may be employed in the other motions as well as for reclining. Such a mechanism, coupled with a seat cushion compressor would produce a significant benefit and is very desirable.

We claim:

1. A seat for a vehicle, comprising:
   a seat back,
   a seat cushion
   at least one power adjustment actuator coupled to the seat, the actuator comprising;
      a motor configured to operate in at least two modes, a low power mode and a high power mode, wherein the motor speed is suitable for normal adjustment operation in the low power mode and high speed operation in the high power mode,
   a rollover sensor,
   a normal adjustment operation motor power supply and;
   a supplemental motor power supply, adapted to provide a high power drive signal to the motor in response to a signal from the rollover sensor indicating the vehicle is in a rollover condition.

2. The seat of claim 1, wherein the power adjustment actuator is
   a seat recliner wherein at least one of the seat cushion and back is reclined rearward rapidly by the motor in response to the signal from the rollover sensor.

3. The seat of claim 1 or 2, wherein the power adjustment actuator is at least one of:
   a seat position adjuster wherein the seat is moved in a side-to-side direction relative to the front of the car rapidly by the motor in response to the signal from the rollover sensor,
   a seat height adjuster wherein the seat is lowered rapidly by the motor in response to the signal from the rollover sensor, or
   a seat position adjuster wherein the seat is moved either forward or backward relative to the front of the car rapidly by the motor in response to the signal from the rollover sensor.

4. The seat of claim 3, further comprising:
   a seat compressor wherein at least one of the seat back and seat cushion is compressed in response to a signal from the rollover sensor indicating the vehicle is a rollover condition.

5. The seat of claim 1, further comprising an integrated safety belt, with a pre-tensioner, wherein the pre-tensioner is triggered in response to a signal from the roll-over sensor.

6. The seat of claim 4, comprising: mechanisms that sense the position of the seat, and
   a system to maximize the safety of a seat occupant by determining, from the position of the seat and the vehicle configuration, the optimum sequence, direction and magnitude of seat motions in response to the rollover signal.

7. The seat of claim 6, wherein the seat further comprises a system for sensing of at least one of the weight or size of the occupant.

8. A seat for a vehicle, comprising:
   a seat back,
   a seat cushion
   at least one power adjustment actuator coupled to the seat, the actuator comprising;
      a motor configured to operate in at least two modes, a low power mode and a high power mode, wherein the motor speed is suitable for normal adjustment operation in the low power mode and high speed operation in the high power mode,
   a rollover sensor,
   a normal adjustment operation motor power supply and;
   a supplemental motor power supply, adapted to provide a high power drive signal to the motor in response to a signal from the rollover sensor indicating the vehicle is in a rollover condition,
   a seat compressor, wherein at least one of the seat back and seat cushion is compressed in response to a signal from the rollover sensor indicating the vehicle is a rollover condition, and;
   and integrated safety belt with pre-tensioner.

9. The seat of claim 8, wherein the power adjustment actuator is
   a seat recliner wherein at least one of the seat cushion and back is reclined rearward rapidly by the motor in response to the signal from the rollover sensor.

10. The seat of claim 8 or 9, wherein the power adjustment actuator is at least one of:
   a seat position adjuster wherein the seat is moved in a side-to-side direction relative to the front of the car rapidly by the motor in response to the signal from the rollover sensor,
   a seat height adjuster wherein the seat is lowered rapidly by the motor in response to the signal from the rollover sensor, or
   a seat position adjuster wherein the seat is moved either forward or backward relative to the front of the car rapidly by the motor in response to the signal from the rollover sensor.

* * * * *